United States Patent
Marsch et al.

(10) Patent No.: US 8,422,554 B2
(45) Date of Patent: Apr. 16, 2013

(54) MOBILE COMMUNICATION SYSTEM USING ADAPTIVE TRANSMISSION

(75) Inventors: Patrick Marsch, Dresden (DE); Michael Grieger, Isernhagen (DE)

(73) Assignee: Vodafone Holding GmbH, Düsseldorf (DE)

( * ) Notice: Subject to any disclaimer, the term of this patent is extended or adjusted under 35 U.S.C. 154(b) by 305 days.

(21) Appl. No.: 12/823,273

(22) Filed: Jun. 25, 2010

(65) Prior Publication Data

US 2010/0329187 A1     Dec. 30, 2010

(30) Foreign Application Priority Data

Jun. 30, 2009  (EP) ..................... 09164128

(51) Int. Cl.
*H04N 7/12*     (2006.01)
(52) U.S. Cl.
USPC .................. 375/240.1; 375/240.02
(58) Field of Classification Search ........... 375/240.1, 375/240.2, 240.05, 240.7
See application file for complete search history.

(56) References Cited

U.S. PATENT DOCUMENTS

| | | | |
|---|---|---|---|
| 6,170,749 B1 * | 1/2001 | Goren et al. | 235/462.06 |
| 6,547,142 B1 * | 4/2003 | Goren et al. | 235/462.25 |
| 6,895,219 B2 * | 5/2005 | Bridgelall | 455/41.2 |
| 7,286,507 B1 | 10/2007 | Oh et al. | |
| 2004/0110534 A1 | 6/2004 | Chung et al. | |
| 2005/0077359 A1 * | 4/2005 | Boehm et al. | 235/454 |

FOREIGN PATENT DOCUMENTS

EP       1 906 559 A1     4/2008

* cited by examiner

*Primary Examiner* — Brenda H Pham
(74) *Attorney, Agent, or Firm* — Edwards Wildman Palmer LLP; Peter F. Corless

(57) ABSTRACT

A method for decoding a wireless transmission in a communication system, particularly for mobile communications, comprising a plurality of receiver stations communicatively coupled to a common decoder station, wherein the receiver stations transmit digital representations of received user signals to the common decoding entity. These digital representations are initially transmitted to the common decoder station in coarse granularity, and in case the decoder station cannot decode the transmitted digital representations of one or multiple user signals, the decoder requests a refined digital representation of the received signals from at least one receiver station.

11 Claims, 3 Drawing Sheets

MOBILE COMMUNICATION SYSTEM USING ADAPTIVE TRANSMISSION

CROSS-REFERENCES TO RELATED APPLICATIONS

This application claims under 35 U.S.C. §119(a) the benefit of European Application No. 09164128.2 filed Jun. 30, 2009 the entire contents of which is incorporated herein by reference.

The invention relates to a method for decoding a wireless transmitted signal in a communication system, wherein a plurality of receiver stations is communicatively coupled to a common decoder station. In particular the invention relates to a method, wherein a receiver station forwards a digital representation of a receive signal to the common decoder station, which decodes the wireless transmitted signal based on the forwarded digital representation.

A distributed antenna system (DAS) is a mobile communication system for wireless transmission of information comprising spatially separated antenna nodes, wherein the antenna nodes are coupled to a common decoder station for processing signals received by at least one antenna node or for providing signals to be sent by at least one antenna node. The common decoder station decodes all user signals sent by transmitters assigned to said decoder station. Hence, the decoder station is common to the assigned transmitters and antenna nodes and is thus called common decoder station.

Any conventional transport medium may be used for coupling the antenna nodes to the common decoder station. In one embodiment the transport medium may be wired or alternatively wireless. In any case the transport medium enables a fast and reliable communication between the antenna nodes and the common decoder station, both in uplink and downlink direction.

The general concept of a DAS is to deploy several antenna nodes, so as to provide coverage over the same area as a single base station would cover. That is for sending information from a DAS to a transmitter connected to the system, a single antenna radiating at high power is replaced by more than one low-power antenna node to geographically cover the same area. Vice versa, i.e. for receiving signals from a transmitter coupled to the system, at least one of the antenna nodes is deployed to receive and forward its receive signal to the common decoder station. Since the areas covered by the antenna nodes may overlap, a signal sent by one transmitter may be received by more than one antenna node. The common decoder may then receive the signal as sent by one transmitter from those antenna nodes having received said signal, i.e. the common decoder may receive the information sent by the transmitter from a plurality of antenna nodes thus receiving more information about said signal.

Conventional distributed antenna systems exhibit a plurality of advantageous properties. Due to the plurality of antenna nodes in one cell, the nodes can be located to avoid shadowing effects and line-of-sight channels are present more frequently, thus improving the quality of a received signal. Furthermore if the common decoder station receives the signal from more than one antenna node, it may select the best signal or all signals for processing, i.e. decoding, the received signal. Also, since the average distance from a transmitter to an antenna node is smaller as in a single high-power antenna system and receiver side array gain can be exploited; the transmitter may transmit the signal using less power, thus saving energy at the transmitter side. Besides said diversity and power gains, several receive and transmit antennas allow to separate several data streams that are transmitted on the same resource, i.e. at the same time using the same frequency. The decoding of these spatially multiplexed signals relies on uncorrelated signal paths, wherein uncorrelated signal paths result from a geographical distance between transmit antennas and also from the geographical distance between receive antennas. Uncorrelated signal paths accordingly are more likely in distributed antenna systems.

In a communication network, i.e. a cell phone network for example, the common decoder station may be a base station or a node-B, which receives user data signals and actually decodes the binary user data from a signal. In contrast, antenna nodes do not decode signals to extract the binary user data, but forward a digital representation of a receive signal to the common decoder station for processing. Note that a node-B may be adapted and configured to serve as antenna node only. A node-B may act as an antenna node and forward a digital representation of a receive signal to another node-B acting as decoder station. However, an antenna node may perform some basic processing of the received signal, i.e. an antenna node may use pilot signals for tuning an equalizer in an antenna node for reversing signal distortions caused by a transmission channel. Furthermore and depending on the specific modulation scheme used in the communication system, an antenna node may handle at least part of the protocol overhead associated with the modulation scheme.

In any case, each antenna node forwards its receive signal to the common decoder station, which for that purpose is communicatively coupled to the antenna nodes. Accordingly, the communication link between an antenna node and its assigned decoder station is stressed with the receive signal that an antenna node forwards to its assigned decoder station. As a consequence, an antenna node may cause huge data load on the communication link to the decoder station. Considering a communication link of limited bandwidth, the signal forwarded from an antenna node to a decoder station preferably should enable the decoder to decode the user data with the best quality possible while at the same time preserving processing resources in the common decoder station and transmission capacity on the communication link. Hence there is a need for optimizing the transmission of user data, i.e. the transmission of signals representing user data from an antenna node to a common decoder station.

BRIEF DESCRIPTION OF THE FIGURES

In the following the invention will be described using the accompanying figures, wherein.

DETAILED DESCRIPTION

The invention is now described with reference to a few preferred embodiments thereof, as illustrated in the accompanying drawings. Numerous specific details are set forth in order to provide a thorough understanding of the invention. It will be apparent, however, to a person skilled in the art, that the present invention may be practiced without some or all of these specific details.

In the following description, an entity receiving a user data signal from a transmitter may deviate from what is commonly understood as an antenna node. Consequently an entity, which receives a user data signal from a transmitter station and passes a digital representation of that signal to another entity, is called a receiver station in the following description.

Similarly an entity intended for decoding digital representations of user data signals transmitted from receiver stations to the entity is called a decoder station.

Figure 1:
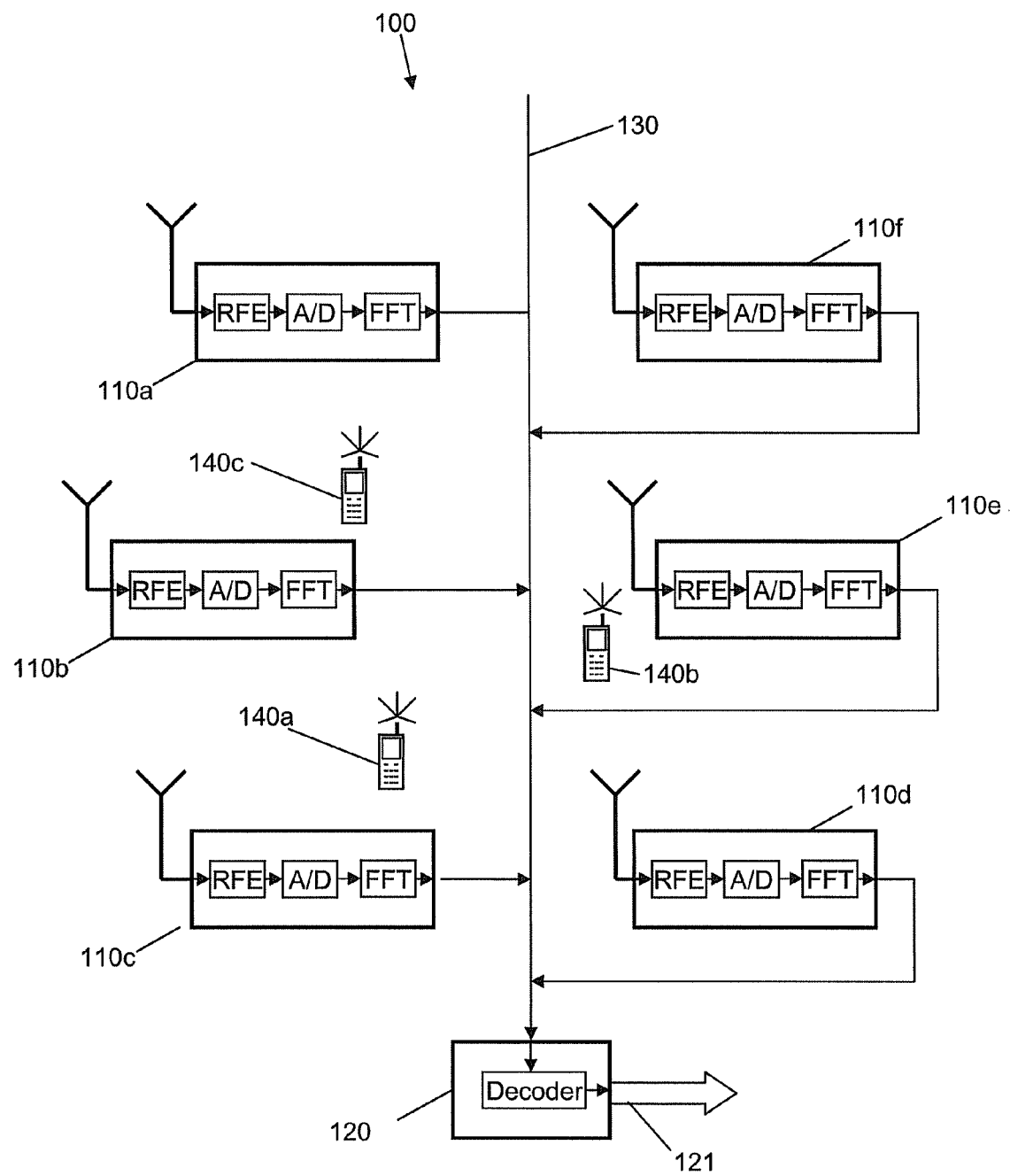
FIG. 1 depicts a schematic topology of a distributed antenna system.

FIG. 1 depicts an embodiment of a topology of a cellular communication system 100, wherein the system comprises at least one cell. The cell typically may be one of a plurality of adjacent cells, the cellular communication system thus covering a geographical area. The cell comprises at least two receiver stations, i.e. in the depicted topology six receiver stations 110a to 110f, a common decoder station 120 and a so-called backhaul network 130, which at least communicatively couples all receiver stations 110 to the common decoder station 120.

In the depicted arrangement all receiver stations 110 of a cell are communicatively coupled with one decoder station 120, to which they forward their receive signal for decoding; receiver stations and decoder station thus being arranged in a star configuration. However, since the invention is not limited to a specific arrangement of receiver stations and decoder stations, the invention may be implemented in any arbitrary topology. Also, the topology does not have to be fixed in that the functionality of a station is fixed. Instead, provided a station is equipped with hard- and software correspondingly, the functionality of a station may be adapted dynamically depending for example on the channel quality. That is, the functionality of a decoder station and communicatively coupled receiver stations generally may be arbitrarily assigned for each data word transmitted from a transmitter to a receiver station.

Each of the receiver stations 110 may comprise processing circuitry to perform signal processing as necessary. As depicted in the figure, each receiver station may comprise a radio frequency (RF) frontend for receiving and basic processing of radio signals. The RF frontend may comprise a down-converter for down converting a received RF signal to an intermediate frequency (IF) or a baseband frequency and an analog-to-digital (AD) converter for digitizing an analog receive signal.

Each receiver station may comprise a plurality of antennas. Since a signal may be received by more than one antenna, the receiver station may perform a maximum ratio combining or selection combining of the received signals to generate a resulting received signal for further processing.

In addition, the receiver station may optionally comprise the functionality of performing a Fourier Transformation, particularly a Fast Fourier Transformation (FFT). The digital representation of the received signal may be transformed from the time domain to the frequency domain by passing the digitized signal through a Fast Fourier Transformation (FFT), which outputs a frequency domain representation of the digitized signal.

Furthermore, each receiver station may comprise a storage medium for storing digital data, particularly for storing a digitized representation of a received signal, wherein the representation may be in time or frequency domain representation. In one embodiment the storage medium can be any volatile or non-volatile memory device capable of storing digital data. Furthermore, a receiver station may comprise additional circuitry for accessing and managing a stored digital representation of a signal, i.e. circuitry for writing a digital representation to the storage device and for reading or deleting data from the memory device.

Also each receiver station comprises a communication interface to pass information via backhaul network 130 to a common decoder station 120 for processing, wherein the information may comprise a representation of the receive signal or estimated/determined channel information. The communication interface is furthermore configured and adapted to receive and process requests from a common decoder station.

Note that a receiver station may comprise further circuitry. In one embodiment each receiver station may comprise an equalizer and/or a channel estimator block for estimating and determining properties of channels. In this way, a receiver station is capable of estimating/determining properties of receiver channels, which in one embodiment can be used for tuning an equalizer to remove as much distortion from a received signal as possible.

Common decoder station 120 receives digital representations of signals received by communicatively coupled receiver stations 110 via backhaul network 130. Decoder 120 processes the received signals, i.e. particularly decodes received signals, and outputs the information, i.e. the bits and bytes transmitted by a signal, at its output terminal 121. Common decoder station 120 accordingly comprises all circuitry enabling the decoder to decode user data signals.

Each receiver station 110 transmits a digital representation of a receive signal to the common decoder station 120, wherein the receive signal may be a superposition of a plurality of signals transmitted by a plurality of transmitters 140 and interference caused by other transmissions from a transmitter to a receiver station and caused by the receiver station itself. The common decoder station may thus receive a plurality of digital representations of received signals. Since a signal transmitted by one transmitter may be received by more than one receiver station, the common decoder station may receive more than one digital representation of a signal sent by said one transmitter. In this way common decoder station 120 may receive a plurality of digital representations, which may represent a plurality of signals transmitted by a plurality of transmitters 140, wherein more than one digital representation may reflect a signal transmitted by one transmitter and/or a plurality of digital representations may reflect signals using the same resource, i.e. the same frequency at the same time.

Common decoder station 120 is adapted and configured to process the plurality of forwarded digital representations, i.e. to jointly decode the plurality of user signals reflected by the plurality of forwarded digital representations. In one embodiment, common decoder station 120 may use a maximum likelihood decoding method to decode the signals, i.e. to determine the user data from the signals. In an alternative embodiment, decoder station 120 may linearly separate the transmitted signals using a minimum mean squared error or a zero-forcing filter and decode signals independently. Optionally, the successful decoding of a transmitted codeword allows mitigating the interference by employing a successive interference cancellation (SIC) scheme, in which a decoded user signal is subtracted from digital representations. In this way, the signal to noise and interference ratio (SINR) is improved. It is to be noted that the disclosed method is independent from any particular decoding method, i.e. any decoding method may be deployed and may profit from the disclosed invention as described herein.

In one embodiment, the digital representations of user data signals as passed from a receiver station are representations in the frequency domain, particularly when the modulation scheme is an OFDM scheme. Alternatively, the digital representations of user data signals may be in the time domain, particularly when the communication system deploys a CDMA modulation scheme.

Common decoder station 120 may further take channel information as input, i.e. the receiver stations may transmit their estimated/determined information of receiver channel characteristics to decoder 120. Decoder 120 may be configured and adapted accordingly to take the estimated channel characteristics into account when decoding a user signal. In one embodiment, decoder 120 may be configured and adapted to estimate/determine receiver channel characteristics from pilot signal information, which may be embedded in a forwarded digital representation of a user data signal, by its own processing, thus producing information about receiver channel characteristics by its own processing.

Decoder station 120 may be furthermore coupled to other decoder stations in the communication system, thus enabling the decoder stations to cooperate, particularly for exchanging user data signals in case user data sent by a transmitter located at a borderline of a communication cell have been received in the adjacent cell. In this case the common decoder station of the adjacent cell may forward a received user signal, which was not intended for the adjacent cell.

Furthermore decoder 120 is configured and adapted to determine an error when decoding a user signal. In this case the decoder performs an error handling in order to decode the user signal without or, in cases where a plurality of errors has been encountered, with fewer errors. Said error handling for reducing decoding errors will be explained later on. However, as will become apparent from the description below, decoder 120 is adapted and configured to perform the error handling.

In one embodiment common decoder station may be a so-called base station adapted and configured for performing the decoding as described above. Considering now that receiver stations—as mentioned above—may also be implemented by so-called base stations, it is to be noted that he base station acting as common decoder station 120 is adapted and configured to act as common decoder station correspondingly, whereas base stations acting as receiver stations 110 are configured and adapted accordingly.

Backhaul network 130 can be any communication network suitable for coupling a plurality of receiver stations 110 to a common decoder station 120. In one embodiment, backhaul network 130 may be implemented by a wired or wireless connection. In one embodiment backhaul link may be implemented as tcp/ip-based and/or Ethernet-based LAN connection.

Transmitters 140*a* to 140*c*, which may be assigned to and active in a cell of communication system 100, may be any device suitable for communicating with the system. In one embodiment, a transmitter 140 may be a cell phone, a so-called personal digital assistant (PDA) or a laptop equipped with appropriate features for using system 100. Whenever a transmitter 140 transmits user data uplink, i.e. a signal representing the data is sent from transmitter 140 to at least one receiver station 110 of system 100, the at least one receiver station 110 receives the signal and forwards a digital representation of the received signal to a common decoder station 120 via backhaul link 130. Considering now that one or a plurality of transmitters may send data uplink at the same time, wherein each corresponding signal may be received by more than one receiver station, then a plurality of receiver stations 110 will forward the received signals to a decoder station 120. The receiver stations in this way cause data traffic on backhaul link 130, thus causing huge data traffic on the backhaul link.

This problem generally relates to all data transmitted via backhaul link 130 to decoder station 120, i.e. also any data transmitted from any entity of an adjacent communication cell may be affected in this way. As a consequence, system 100 may not operate at its optimum performance, since the decoding of the user data signals may be delayed, the decoder station thus providing the decoded user data delayed. Moreover, particularly when data transmitted via link 130 cannot be provided to the common decoder station in time, the decoder station may decode a user data signal without considering all information, which theoretically could have been provided to the decoder station.

The performance of the communication system may be improved by adapting the traffic load on the communication link between the receiver stations and the decoder station while at the same time enabling a common decoder station to decode user data signals in time and with acceptable quality, wherein it is a trade-off between the quality of the transmitter's connection and the required backhaul capacity.

For reducing the data traffic caused by each receiver station 110 on communication link 130, each receiver station initially transmits a digital data representation of a received signal, wherein the initially transmitted digital representation is a coarse representation of the received signal. A coarse representation of a signal can be represented by fewer data than a fine representation. Consequently, a fine representation of a received signal is a more exact digital representation of the sampled analog signal, but at the cost of a higher data volume.

By transmitting data representing a coarse representation of a received user signal the data traffic on link 130 is reduced, thus enabling a faster data transmission for providing the data in time for processing.

The data received initially at the common processing entity accordingly does not represent the received signal at its most detailed resolution. However, this initially transmitted coarse representation of a received signal may enable the common decoder station to decode the signal with acceptable quality.

In case successful decoding is not possible when decoding a signal, then the decoder station may request a more exact digital representation of that signal from at least one of the receiver stations and may decode the received signal based on the improved, i.e. more exact representation of the received signal.

Figure 2:
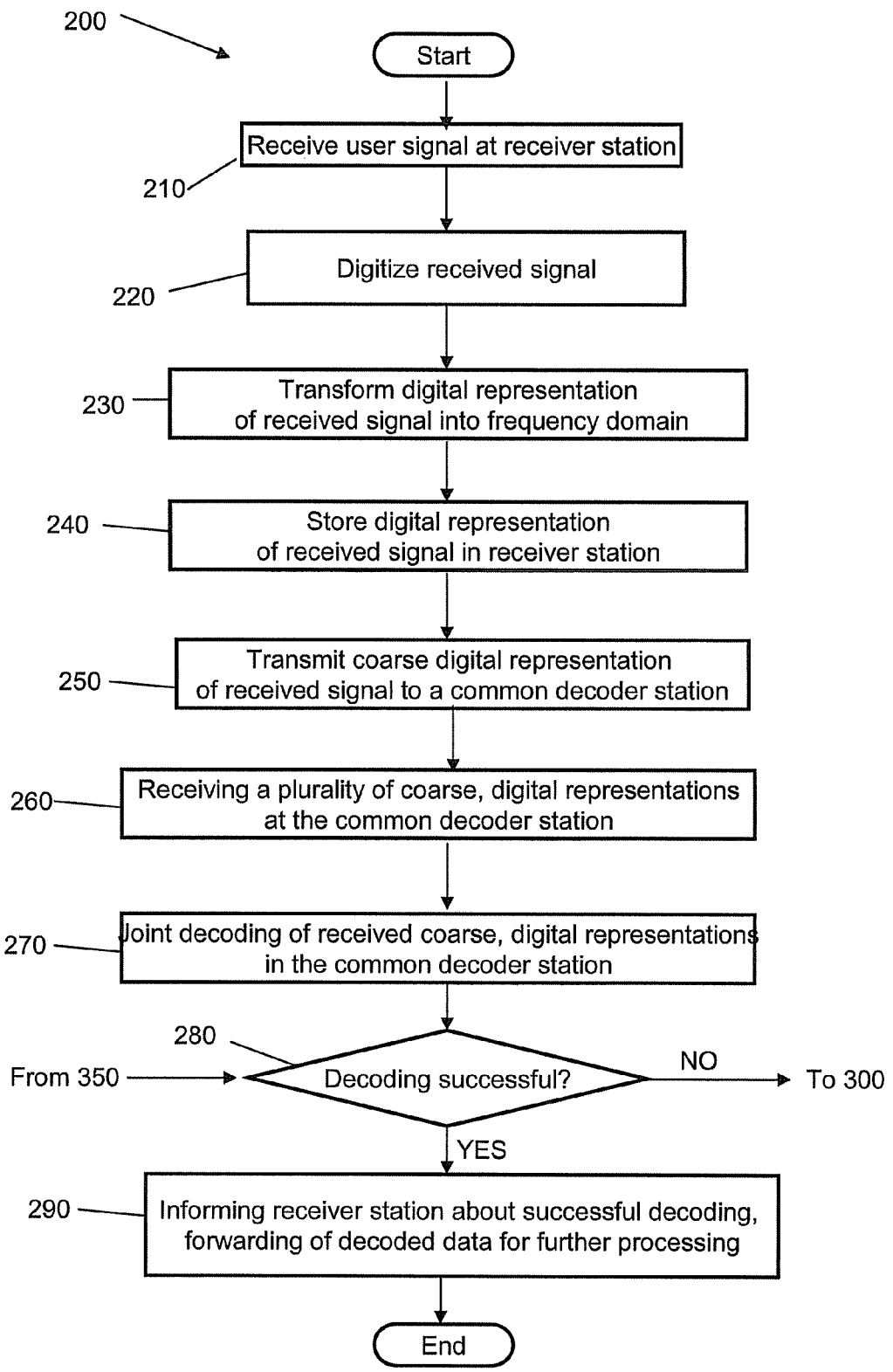
FIGS. 2, 3 depict a flow diagram illustrating the sequence of method steps.
Figure 3:
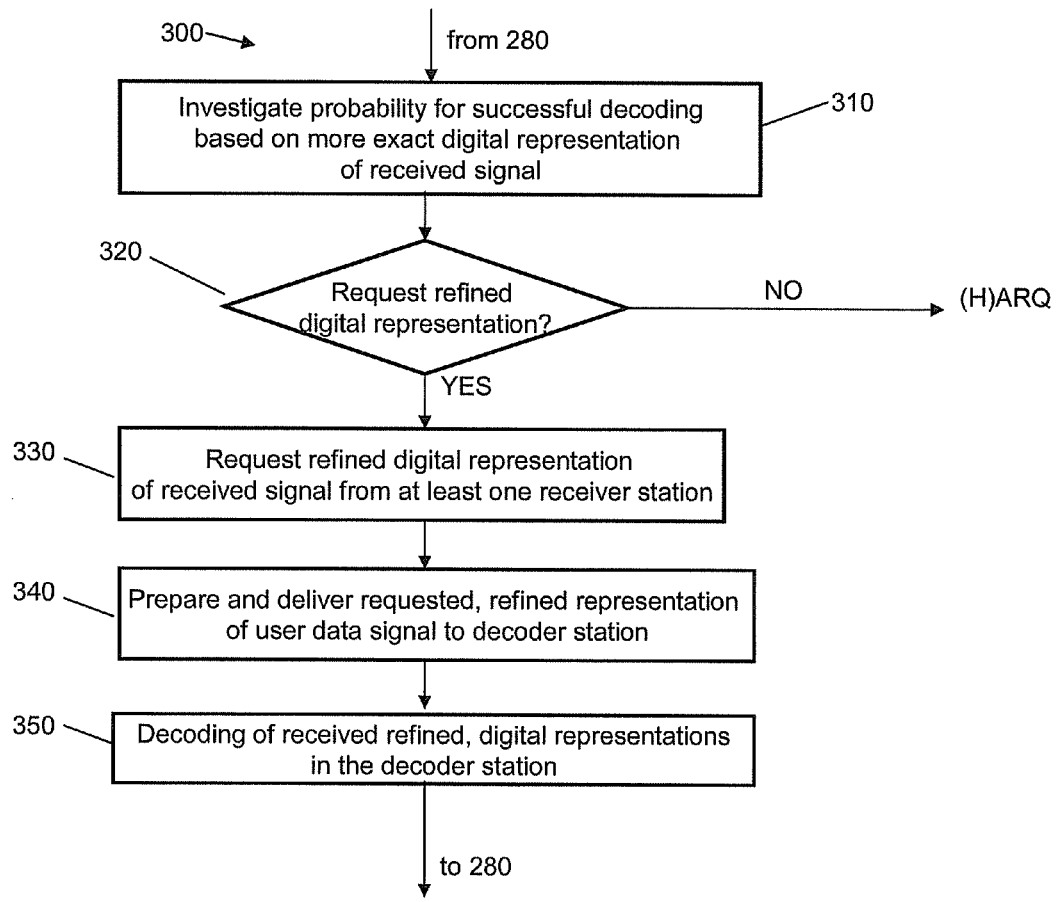

Relating now to FIG. 2 the proposed method for receiving and decoding a user data signal is described in more detail as a flow chart 200.

The method starts at method step 210 with receiving a signal in at least one receiver station, wherein the signal is transmitted by at least one transmitter. A transmitter may be any communication device suitable for communicating in a cellular communication system as described above. The receiver station may be equipped as described above, such that the receiver station is adapted and configured to perform the method steps as described below. Note that the received signal may comprise user data and protocol overhead, for example such as pilot signals.

The received signal, which is received as an analog signal, i.e. continuous over time and value, is then digitized in the receiver station at 220. By sampling and quantizing the optionally matched filtered received analog signal, a digital representation of the received signal is generated, wherein said digital representation reflects the received signal in the time domain. Preferably this digital representation is performed deploying a high resolution, i.e. the analog signal is sampled at a high sampling rate and the quantizer quantizes the discrete sample values using a fine granularity, i.e. using small quantization steps. Note that the processing step of digitizing a received signal can be considered as a lossy compression, since the quantized digital representation requires a comparatively small amount of data when compared with perfect digital representation requiring an indefinite amount of data. Insofar—and in conformity with some literature—the processing step of producing a digital representation of a received signal may be considered as a compression.

Optionally, the digital representation of the received signal may be transformed by a Fourier Transformation to a frequency domain representation in processing block 230. Since the output of the Fourier Transformation is also a digital value, the frequency domain representation is also a digital representation of the user signal. This optional Fourier Transformation preferably also uses a fine granularity, i.e. the transformation detects all frequencies contained in the user signal, thus producing a preferably exact digital representation of the received signal, which is a fine representation of the signal, in frequency domain.

Next, in step 240 a digital representation of the received signal is stored in a storage medium comprised in a receiver station, wherein the digital representation is either a representation in the time domain or, if that has been transformed by a Fourier Transformation, as an equivalent representation in the frequency domain. In any case, a copy of the highest resolution, i.e. the most accurate digital representation of the received signal, is stored in the storage medium comprised in the receiver station.

It is to be noted that a receiver station may process a received signal furthermore for various purposes. In one embodiment a receiver station may use and process a signal or portions of a received signal to determine channel characteristics, i.e. coefficients of a digital channel representation, for tuning an equalizer comprised in the receiver station. For this purpose, the receiver station may determine the attenuation, the phase error or other distortions caused by a channel. In one embodiment a receiver station may use a pilot signal as specified in the wireless transmission protocol, where the pilot signal is comprised in the signal. That is, a receiver station may use a signal or portions of a received signal to adjust itself in order to reverse distortions caused by the channel. These optional processing steps performed in a receiver station 110 are not depicted in FIG. 2.

A receiver station then, i.e. in processing step 250, transmits a digital representation of the received signal to its assigned common decoder station for further processing, i.e. for decoding. The transmitted digital representation of the received signal may be either a representation in time domain or in frequency domain where appropriate. That is, in case the transmission scheme used for the wireless transmission is a code division multiple access (CDMA) modulation scheme, the digital representation of the received signal advantageously may be a representation in time domain. In case the transmission scheme is an orthogonal frequency division multiplex system (OFDM), the digital representation preferably is in the frequency domain.

In each case, this first transmission of the digital representation of the received signal is a comparatively coarse representation of the digital representation produced in the receiver station. The receiver station accordingly does not transmit the most exact digital representation as produced and as stored in the receiver station. Instead it sends a coarse digital representation of the received signal to the decoder station.

In one embodiment the coarse, digital representation of the received signal is produced by sending only the most significant bits of a digital representation value of the received signal. Consequently, the least significant bits of a digital representation value are not sent from a receiver station to the decoder station in this first, i.e. initial, transmission. In this way the data volume transmitted via the link between receiver stations and the decoder station is significantly reduced, thus reducing the data load on a backhaul link caused by transmitting digital representations of a received signal to decoder stations.

Generally the digital representation of the receive signal may be compressed by a lossy compression scheme before it is forwarded to the decoder station. It will become clear in the following explanations of the invention that particularly compression schemes are suitable that allow a successive multi-stage compression, which is optimal at all stages. For example, in case of a two-stage compression comprising a first compression of rate R1 and a single refinement with an additional rate of ΔR, the achievable distortions have to lie on the rate distortion curve R(D), where D is the occurring compression distortion, i.e.

$$R_1 = R(D_1), R_1 + \Delta R = R(D_2).$$

A receiver station optionally may also transmit channel information to the common decoder station, wherein the channel information characterizes transmission properties of the channel between the transmitter and the receiver station. In one embodiment the channel information can be a digital representation of the transmission channel, wherein said channel information has been determined by a channel estimator comprised in the receiver station, and wherein the estimator processes protocol data, i.e. in one embodiment pilot signals.

At the side of the decoder station, a plurality of coarse, digital representations of signals that were received at different antennas may be received in processing step 260. Optionally the received coarse, digital representations are prepared for decoding, i.e. in case the digital representation is not a representation in frequency domain the decoder station will transform that by applying a Fourier Transformation on the received, coarse digital representation.

In addition, channel information sent by a receiver station to the decoder station also may be received at the decoder. In that case the decoder station may optionally use the provided channel information when decoding the forwarded digital representations of the receive signals to recover the payload data from the receive signals.

Upon receiving the digital representations at the decoder station, the station optionally may check if the step of decoding may be performed successful prior to actually performing the decoding step. In one embodiment, the receiver station may calculate the signal-to-noise ratio (SNR) of the digital representations. In case the SNR exceeds a predefined threshold value, the decoder may determine that most likely the decoding cannot be performed successfully. In that case the decoder will act as if the decoding was unsuccessful, see below. Otherwise, i.e. in case the calculated SNR indicates that decoding may be performed successfully, the decoder station will proceed with actually decoding the digital representations.

Then the signal, i.e. its digital representation, is decoded, i.e. the user data is extracted from a received signal, wherein the common decoder station decodes the signal based on at least one received digital, coarse representation of a received signal. In case a plurality of digital, coarse representations of one signal is received, the decoding step may be based on a plurality of these representations. In case a digital representation of received signal represents a superposition of a plurality of user signals, i.e. a superposition of more than one user signal using the same resource, i.e. the same frequency at the same time, and noise the decoder may decode said user signals from the digital representation jointly thus performing a joint decoding step 270. Depending on the format of the received digital representation of a received signal, the step of decoding may comprise additional processing steps. In one embodiment, i.e. when the digital representation of the received signal is in time domain, the decoder station may transform the representation into a corresponding representation in the frequency domain by applying a (Fast) Fourier Transformation to the time domain signal. Furthermore, the decoder station may perform some equalizing of the received digital representation of a received signal based on the channel information provided by a receiver station.

Subsequent to decoding a signal, the decoder checks if the step of decoding has been successful, i.e. the data integrity is checked, confer 280. In one embodiment, i.e. in case the transmitted user data comprises a checksum, the decoder may calculate the checksum of the data and compare the calculated value to a value comprised in the transmitted user data. Generally any of the numerous known methods for checking the integrity of transmitted data may be used, for example such as a cyclic redundancy check (CRC). In one embodiment the transmitted user data may also comprise redundancy information enabling so-called forward error correction (FEC), which enables the receiver to correct decoding errors.

In case the step of decoding the provided user data signals is successful, the user data is passed for further processing to any communicatively coupled processing block, i.e. a processing block coupled via 121. The decoder station optionally may inform the receiver stations in step 290 about having decoded the user data successfully by sending an appropriate signal over the backhaul network. A receiver station receiving a signal indicating that the decoder station has successfully decoded a received signal accordingly may delete the stored digital representation of that signal to free the storage space.

In an alternative embodiment or in addition to receiving a signal indicating the successful decoding of a received signal, each receiver station may use a timer signal for triggering the deletion of a stored digital representation of a received signal. That timer signal triggers the deletion independently from receiving a signal confirming a successful decoding of the signal, which in this way prevents the storage device from storing outdated copies of a digital representation of a received signal.

The method for decoding the transmitted received signal then comes to an end successfully, and the method may start again at step 210 for decoding other received signals, which in one embodiment may represent the next data word in a stream of user data transmitted by a transmitter.

In case method step 280, i.e. the step of checking integrity of the decoded data, reveals an error in the decoding process, or at least reveals a high probability of a decoding error, then the decoder station in method step 310 optionally may investigate the probability of successfully decoding based on the assumption of using a digital representation representing the signal more exactly. In other words the decoder station evaluates the probability of successfully decoding the signal if the digital representation of the signal were a fine or at least a finer representation of the signal. Note that this evaluation is performed prior to actually requesting a refined, i.e. a finer, digital representation of a user signal.

In one embodiment the investigation may comprise that a symbol estimator comprised in the decoder station determines the Euclidian distance of a signal point indicated by the coarse representation from a first and a second valid constellation point. That is in case the representation of a user signal represents a point in the middle between a first and a second constellation point, then a refined representation of the digital representation may enable the decoder station to decide which constellation point shall be indicated by the user signal.

In an alternative embodiment the decoder may use likelihood values associated with a decoded word or with decoded bits, wherein these values characterize the probability of a correct decoding. These likelihood values may be utilized for deciding whether a refined digital representation shall be requested, i.e. in case the values are below a predefined threshold value, then a refined digital representation of a signal is requested from at least one receiver station. Optionally the decoder station may request a refined digital representation from more than one receiver station.

In still an alternative embodiment, particularly in case the decoder deploys an iterative decoding method, which may be based on so-called turbo codes or low-density parity check codes (LDPC), the decoder may consider changes of likelihood values during iterative decoding steps. In one embodiment the decoder may request at least one refined digital representation in case the likelihood values exceed predefined threshold values.

Based on the investigation the decoder station decides in step 320 if a refined digital representation shall be requested from at least one receiver station.

In case the investigation reveals a high probability that a successful decoding is feasible based on a finer digital representation of the receive signal, the decoder station requests information associated with that signal enabling the decoder to process a refined digital representation of the receive signal. In one embodiment, the decoder station may request a refined digital representation of the signal, wherein said refined representation not necessarily is the finest possible representation. The at least one receiver station accordingly provides the refined representation, said digital representation providing the information of the previous, not successfully decoded message, plus additional information, which may comprise the next most significant bits of the digital representation generated in the receiver station.

In an alternative embodiment, the decoder station may request from the at least one receiver station said additional information only. Said additional information may be the next more significant bits of the digital representation of the receive signal. The decoder station may then combine the digital representation provided before with the additional information, such that the decoder may process a refined representation of the receive signal.

The decoder station may issue said request by sending a message according to a predefined protocol, wherein said protocol enables the decoder station and the receiver stations to exchange appropriate messages.

Note that in case of a joint decoding, i.e. if the forwarded digital representation represents more than one user signal, the common decoder station may issue a request for transmitting a refined digital representation of the receive signal in case that none of the user signals or not all of the user signals could be decoded. The refined digital representation may then enable to decode all or at least some of the user signals.

The request can be addressed to only one or a plurality of receiver stations. In particular the decoder station may request a refined representation from at least one selected receiver station, i.e. a receiver station reporting high quality channel characteristics, such that there is a high probability that the refined representation of the receive signal enables a successful decoding of the user signal. In this way, i.e. by requesting a refined representation from a selected number of receiver stations only instead of requesting a refined representation from all receiver stations, the traffic caused by said request and the corresponding reply messages reduce the data load on the backhaul link.

At 340, receiver stations receiving a message from the decoder station requesting a refined representation of a receive signal reply as requested. That is, each receiver station receiving a request for a refined representation via the backhaul link from a decoder station, serves the request by preparing and then transmitting a corresponding message comprising the requested refined representation of a receive signal. In order to serve the request, a receiver station may access its stored copy of the receive signal, i.e. the receiver station may read the stored digital representation of the requested signal. Once the stored digital representation of the requested signal is read from its storage location, the receiver station may process the representation to generate a corresponding message to be sent to the requesting common decoder station.

Note that in one embodiment the stored digital representation of a receive signal is the most accurate representation of a receive signal. Based on this representation the receiver station in one embodiment may transmit a copy of this most accurate representation to the requesting decoder station.

Alternatively, the receiver station may generate a digital representation of the receive signal being more exact than transmitted in the first transmission, but which is not the most accurate digital representation of a receive signal. In this case the most accurate digital representation of the signal may be requested in another, subsequent request message issued by the decoder station. As mentioned above said information may be either a digital representation or may be additional information, i.e. an increment, which enables the decoder to refine a previously provided digital representation. In case a receiver station transmits additional information, then the receiver station may transmit the next more significant bits of the stored digital representation.

In processing step 350 the decoder station receives the requested information of the signal, i.e. the requested refinement, and decodes the signal, wherein the decoding is based on or at least takes the refined digital representation of the signal into account.

Following decoding step 350, the decoder station continues with step 280 as described above and depicted in FIG. 2. That is, the decoder checks the integrity of the decoded data, which in one embodiment may be performed by checking a checksum as described above with reference to method step 280. Subsequently and if the decoding has been successful, the decoder station may proceed with step 290 as described above.

Note that after a successful decoding of a digital representation of a signal, a common decoder station has specific knowledge about the fineness of a digital representation needed for a successful decoding. Optionally, a common decoder station may accordingly specify a fineness needed for a successful decoding and instruct a receiver station correspondingly. The common decoder station in this way may optionally instruct a receiver to provide digital representations of a specified fineness, which most probably will enable the common decoder station to successfully decode subsequent forwarded signals. However, in case said fineness as specified by the decoder does not enable the decoder to successfully decode a signal, the decoder station may still request additional information about said signal. Vice versa, i.e. in case the decoder station successfully decodes a provided digital representation of a receive signal and furthermore detects, that the provided digital representation is unnecessarily fine and a successful decoding is possible based on a less fine, i.e. coarser, digital representation, then the common decoder station may instruct a receiver station to provide less fine digital representations in the future. That is, in the future the receiver station will forward a digital representation of another receive signal to the common decoder station, wherein the digital representation may be less fine than before. In this way a common decoder station may dynamically adjust the fineness of digital representations of received signals by instructing receiver stations correspondingly.

In case method step 280 reveals that the decoding as performed in step 350 was not successful, the method may proceed with step 310. Note that this step may be performed only in case another refined digital representation can be generated by a receiver station. In one embodiment each receiver station optionally may indicate that a transmitted, refined digital representation of a receive signal is the finest representation possible, thus indicating that another request for an even finer representation cannot be served.

In cases when either the receiver stations cannot transmit another refined digital representation of a receive signal, which allows a successful decoding, or when in processing step 320 the investigation reveals, that another attempt for decoding a signal based on a refined digital representation is not promising, the decoder station may send a request to at least one receiver station indicating that the receiver station may request the transmitter station to re-send its data. That is, if the user signal as received cannot be decoded at all, the decoder station initiates an automatic repeat request, i.e. a so-called ARQ, requesting the transmitter to transmit at least a portion of the user data again.

When the re-transmitted signal is received by at least one of the receiver stations and a digital representation of that signal has been forwarded to the decoder station, the decoding of that signal may be based on the re-transmitted signal only, thus discarding the previously transmitted digital representation of that signal. Alternatively, the decoder station may take the re-transmitted signal and the signal as received before into account when decoding, thus performing a so-called hybrid ARQ request. Note that in this case the common decoder station may additionally request a digital representation from a receiver station representing an earlier receive signal in order take the first and the repetition into account when decoding a user signal.

The decoding method of a wireless transmitted user signal in a decoder station accordingly comprises the method steps of receiving the user signal at least at one receiver station, wherein the receiver station is communicatively coupled to the decoder station, digitizing the received signal to produce a digital representation of the received signal, transmitting a digital representation of the signal at a first fineness to the decoder station and decoding the transmitted digital representation, and requesting additional information about the signal from the receiver station in case the step of decoding is unsuccessful, the additional information enabling the common decoder station to process a refined digital representation of the signal Furthermore, a cellular communication system for decoding a wireless transmitted user signal is proposed, wherein the system comprises at least one receiver station and a decoder station, which is communicatively coupled to the at least one receiver station, and wherein the receiver station and the decoder station are adapted and configured to perform the steps described above.

The invention claimed is:

1. Method for decoding a wireless transmitted signal at a common decoder station comprising the steps of
receiving the signal at a receiver station, said receiver station being communicatively coupled to the common decoder station, digitizing the signal in the receiver station thus producing a digital representation of the signal, transmitting a first digital representation of the signal at a first fineness to the common decoder station, requesting additional information about the signal from the receiver station in case decoding of the digital representation of the signal cannot be performed successfully, the additional information enabling the common decoder station to process a refined digital representation of the signal, and determining the probability of successfully decoding the refined digital representation.

2. The method of claim 1, further comprising the step of Fourier transforming the digital representation of the signal before transmitting the digital representation of the signal to the common decoder station.

3. The method of claim 1, wherein the method steps of receiving, digitizing and transmitting the signal to the common decoder station are performed in a plurality of receiver stations simultaneously.

4. The method of claim 1, wherein the first digital representation of the signal comprises the most significant bits of the digital representation of the signal only.

5. The method of claim 1, further comprising the step of signalling a successful decoding from the common decoder station to a receiver station.

6. The method of claim 1, further comprising the step of storing a digital representation of the received signal in the receiver station.

7. The method of claim 1, further comprising the step of instructing a receiver station to increase the fineness of a transmitted digital representation by providing additional information on previously received signals, or to increase or decrease the fineness of the transmitted digital representation of signals to be received in the future.

8. A cellular communication system for decoding a wireless transmitted user signal comprising at least one receiver station and a decoder station, the receiver station communicatively coupled to the decoder station, and wherein the receiver station is configured for receiving the wireless transmitted signal, digitizing the received signal thus producing a digital representation of the signal, and transmitting a first digital representation of the signal at a first resolution to the decoder station, and wherein the decoder station is configured for requesting additional information about the signal from the receiver station in case decoding of the digital representation of the signal cannot be performed successfully, the additional information enabling the common decoder station to process a refined digital representation of the signal, and wherein the decoder station is configured for determining the probability of successfully decoding the refined digital representation.

9. The system of claim 8, wherein the receiver station is further configured for performing a Fourier transformation on the digital representation of the signal before transmitting the digital representation to the decoder station.

10. The system of claim 8, wherein the receiver station comprises a storage device for storing a digital representation of a received signal.

11. A method for decoding a wireless transmitted signal at a common decoder station comprising the steps of receiving the signal at a receiver station, said receiver station being communicatively coupled to the common decoder station, digitizing the signal in the receiver station thus producing a digital representation of the signal, transmitting a first digital representation of the signal at a first fineness to the common decoder station, requesting additional information about the signal from the receiver station in case decoding of the digital representation of the signal cannot be performed successfully, the additional information enabling the common decoder station to process a refined digital representation of the signal, wherein the receiving, digitizing and transmitting the signal to the common decoder station are performed in a plurality of receiver stations simultaneously.

\* \* \* \* \*